United States Patent

[11] 3,634,754

| [72] | Inventors | James E. Lovelock<br>Sailisbury, Wilts;<br>Albert J. Davies; Frank R. Ferris, both of<br>Hoole, near Chester, all of England |
|---|---|---|
| [21] | Appl. No. | 835,324 |
| [22] | Filed | June 23, 1969 |
| [45] | Patented | Jan. 11, 1972 |
| [73] | Assignee | Shell Oil Company<br>New York, N.Y. |

[54] METHOD AND APPARATUS FOR LINEARLY MEASURING ELECTRON CAPTURE WITH AN ELECTRON CAPTURE DETECTOR
9 Claims, 3 Drawing Figs.

[52] U.S. Cl. .................................................. 324/33
[51] Int. Cl. .................................................. G01n 27/62

[50] Field of Search .................................................. 324/33;
73/40.5

[56] References Cited
FOREIGN PATENTS
1,048,513  11/1966  Great Britain ................ 324/133

*Primary Examiner*—Gerard R. Strecker
*Attorneys*—Theodore E. Bieber and J. H. McCarthy ABSTRACT: Linear response is obtained from an electron capture measuring device by pulsing an electron capture detector at a variable frequency, automatically varying the frequency in accordance with the detector current, measuring the frequency, and using the frequency measurement as the output of the device.

PATENTED JAN 11 1972                                    3,634,754

INVENTORS:
JAMES E. LOVELOCK
ALBERT J. DAVIES
FRANK R. FERRIES

METHOD AND APPARATUS FOR LINEARLY MEASURING ELECTRON CAPTURE WITH AN ELECTRON CAPTURE DETECTOR

BACKGROUND OF THE INVENTION

The present invention relates to a device for linearizing the response of an electron capture detector.

An electron capture detector is an ionization cell having a pair of spaced-apart electrodes and a source of ionizing radiation, for example, tritium therein. Carrier gas on flowing through the detector is ionized by emission from the source. By applying a voltage between the electrodes the free electrons formed are collected at the anode to provide a constant detector standing current. If a trace of material containing molecules which are electron absorbing (the "electron capture material") is introduced into the carrier gas flowing through the detector some of the free electrons will be captured by these molecules. The reduction in the number of free electrons is evident from a fall in the standing current.

In practice, electron capture is but one of a number of simultaneous processes which affect the current between the electrodes. It is desirable to utilize weak continuous electric fields between the electrodes in order that electrons collide with the electron-absorbing molecules frequently enough to have a high probability of capture. Such fields are susceptible to contact potential changes due to absorption of material on the electrodes, the contact potential supplementing or opposing the detector voltage. Furthermore, a space charge can develop due to the accumulation of sluggish positive ions adjacent the cathode. The space charge will set up a potential opposite to that of the applied field. These processes affect the standing current in an unpredictable way.

These drawbacks with an electron capture detector operating at a constant low potential can be overcome by reverting to a pulse sampling method, in which the electrodes are strongly polarized by a succession of very short pulses at relatively long intervals. This type of operation, known as a pulsed operation, still shares with the operation at a constant potential the disadvantage of a very nonlinear relationship between the detector current and the concentration of an electron capture material introduced into the detector.

SUMMARY OF THE INVENTION

The present invention seeks to provide a measuring circuit for use in combination with an electron capture detector that makes it possible to obtain a response which is linearly related to the concentration of an electron capture material introduced into the detector. Such a device will be extremely attractive for quantitative work.

According to the present invention a measuring system for use in combination with an electron capture detector comprises a pulse generator of a type suitable for generating voltage pulses at a certain frequency and arranged to supply these pulses to a pair of terminals to which the detector can be connected; an electrometer arranged to measure the current supplied to the detector via the said terminals and capable of producing at its output a signal varying in accordance with the measured value; and means, connected to the electrometer output, for adjusting the frequency of the pulse generator in response to the electrometer output signal and thereby opposing the influence of variations in the measured concentration on the detector current.

A measure for the concentration of electron capture material is suitably obtained when the measuring circuit comprises means for indicating or recording the output signal of the electrometer or a meter for the pulse generator frequency.

If, according to the invention, the measuring circuit comprises means capable of counting the pulses generated by the pulse generator, the counted number will provide information on the total amount of electron capture material that has passed through the detector.

The electrometer, the means for adjusting the pulse generator frequency, the pulse generator and the connections between these parts establish a relationship between the pulse generator frequency and the detector current. This relationship is preferably linear.

External adjustment of the detector current can be realized when means for providing an adjustable bias in the relationship mentioned in the preceding paragraph are included in the circuit.

According to the invention the best results are obtained if the changes in frequency effected by the means for adjusting the pulse generator frequency substantially compensate for the influence of variations in the measured concentration on the detector current. In this case the magnitude of the detector current is obviously unsuitable as a measure for the concentration of electron capture material.

In a preferred embodiment of the invention the output signal of the electrometer is a variable DC voltage, while the pulse generator and the means for adjusting the frequency thereof respectively comprise a blocking oscillator and a transistor, the transistor being arranged to control the discharge current of a condenser of the blocking oscillator (and thereby the pulse frequency) in dependence on the electrometer output voltage.

The invention further concerns a measuring apparatus comprising a measuring circuit as hereinbefore described and an electron capture detector.

The invention can be understood by assuming that, for pulsed operation of an electron capture detector, the relationship between the average cell current $I$ and the concentration $x$ of an electron capture material, introduced into the detector by a carrier gas, can be expressed as $$I = \text{function}\,[(ax+b)\,T]$$

where
- $a =$ a constant determined by the electron capture material;
- $b =$ a constant determined by the carrier gas; and
- $T =$ the pulse interval. o =

This assumption is supported by theoretical considerations with respect to the processes taking place inside the detector.

Thus, the cell current $I_o$ at zero concentration ($x=o$) and a given pulse interval $T_o$ is given by:

$$I_o = \text{function}\,(b \cdot T_o).$$

Upon the introduction of a concentration $x$ of an electron capture material into the detector there is a fall in the current through the detector. If the current is restored to its value at zero concentration of electron capture material by reducing the time interval to a new value $T_x$, then $$I_o = \text{function}\,(b \cdot T_o) = \text{function}\,[(ax+b)\,T_x]$$

or $$b \cdot T_o = (ax+b)\,T_x.$$

Now, since the duration of a pulse is very small when compared with the pulse interval, the pulse frequency $F$ is approximately equal to $1/T$. Hence $F_x - F_o = a/b F_o \cdot x$. The above is an equation of a straight line of slope $(a/b) \cdot F_o$ and intercept $F_o$.

Hence, a detector when operating at substantially constant average detector current maintained by adjustment of $F$ and which uses $F$ as a measure of concentration will have a linear response.

The explanation given above may be considered to refer to the extreme case in which the influence of the concentration is fully compensated by changes in frequency. In cases where this influence is opposed to a lesser degree, the response obtainable from the measuring circuit will deviate more or less from the desired linearity depending on the degree in which the influence of the concentration on the detector current is compensated. In the latter cases it is also possible to use the detector current as a measure for the concentration. The response of the detector current is then less nonlinear than in the case in which the detector is operated at a constant pulse frequency.

It is thus the primary object of this invention to provide a method and apparatus for linearizing the response of an electron capture measuring device.

It is another object of the invention to accomplish the foregoing purpose by applying a variable-frequency pulsed current to an electron capture detector, automatically varying the frequency in accordance with the detector current, and measuring and indicating the frequency.

DESCRIPTION OF THE PREFERRED EMBODIMENT

Figure 1:
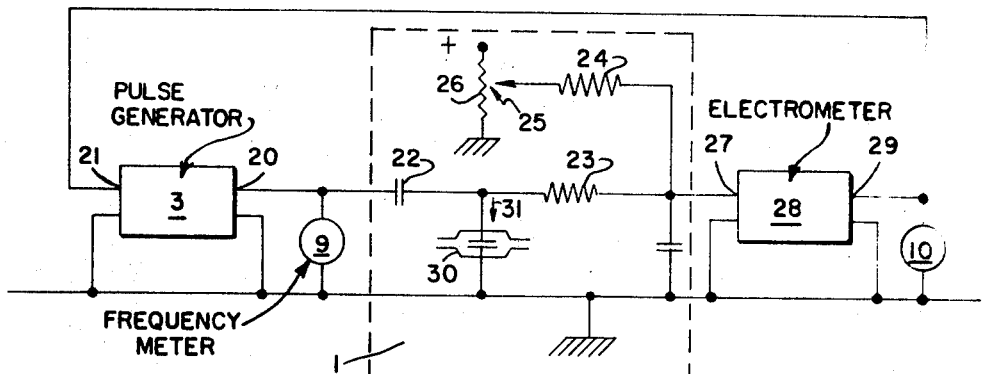
FIG. 1 is a partly schematic diagram of an apparatus according to the present invention.

In FIG. 1 a block 1 includes the electron capture detector 30 and network means for connecting the detector 30 to an output 20 of a pulse generator and to an input 27 of an electrometer 28. Voltage pulses are generated by the generator and are applied to the detector 30 through a condenser 22. The voltage pulses cause a pulsating current 31 to flow through the detector. The DC component $I$ of this current (which is on the order of $10^{-9}$ a.) depends on the concentration of electron capture material in the detector and on the frequency of the pulse generator in such a way as to decrease upon an increase in concentration and to increase upon an increase in frequency. Condenser 22 prevents this DC component of the detector current 31 from flowing through the pulse generator and forces it to flow through two high-resistance resistors 23 and 24 to a point 25 of substantially constant voltage $V$. Accordingly, a voltage $V=V_o-RI$ is developed at input 27 ($R$ representing the value of resistance 24). Electrometer 28 produces at its output 29 a signal corresponding to $V$ and thus to the DC component $I$ of the detector current 31. A block 3 schematically indicates the pulse generator and the means for adjusting the frequency thereof, the point 21 indicating an input of these frequency adjusting means. Input 21 is connected to output 29 of the electrometer. The signs of response of the electrometer 28 and of the frequency-adjusting means have been chosen in such a way that a decrease or increase in the current $I$ results in an increase or decrease, respectively, in the pulse frequency.

A frequency meter 9 is connected to output 20 of the pulse generator. Indicating and/or recording means 10 are connected to the output 29 of the electrometer 28.

Potentiometer 26 provides the possibility of introducing an adjustable bias in the relation between the current $I$ and the pulse frequency. By adjusting potentiometer 26 the current $I$ and the pulse frequency $F$ can be varied. This feature can be used for adjusting one of these variables to a desired value. The place in the circuit of the means for providing a bias is not limited to the example presented in the drawing. These means may also be located in the electrometer, the means for adjusting the frequency or the pulse generator or in the connections between these parts.

Figure 2:
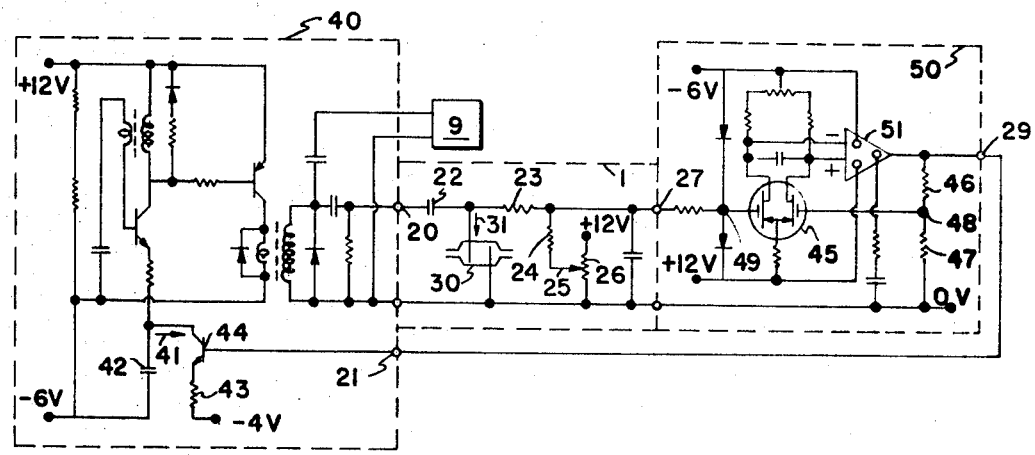
FIG. 2 is a circuit diagram of another apparatus according to the present invention.

A circuit diagram of a measuring circuit and an electron capture detector is presented in FIG. 2, in which the numerals that have been used in FIG. 1 have the same meaning. In this Figure a block 40 includes a blocking oscillator. This blocking oscillator is paralyzed after each pulse until discharge of a capacitor 42. The pulse frequency $F$ is thus determined by the rate of discharge of capacitor 42.

The electrometer 50 is coupled to the blocking oscillator by means of a transistor 44. The discharge current 41 of the capacitor 42 is the collector current of the transistor 44. The current 41 is controlled by the potential of the base of the transistor 44.

The electrometer comprises a very high resistance input stage, a dual metal oxide silicon field effect transistor 45 followed by a high gain differential amplifier 51. The electrometer output potential $V_e$ which is fed back to the base of the right-hand half of transistor 45 is given approximately by:

$$V_e=(R_1+R_2/R_2(V_o-RI)$$

where $R_1$ and $R_2$ are the values of resistances 46 and 47.

The small reduction in $I$ (the detector current) by the presence of electron capture material in the detector results in a large increase in $V_e$. An increase in $V_e$, the potential applied to the base of transistor 45, results in an increase in discharge current 41 and hence an increase in the pulse frequency $F$. The pulse frequency is displayed on the frequency meter 9. The increase in pulse frequency restores $I$ to substantially its value before the introduction of electron capture material into the detector.

Figure 3:
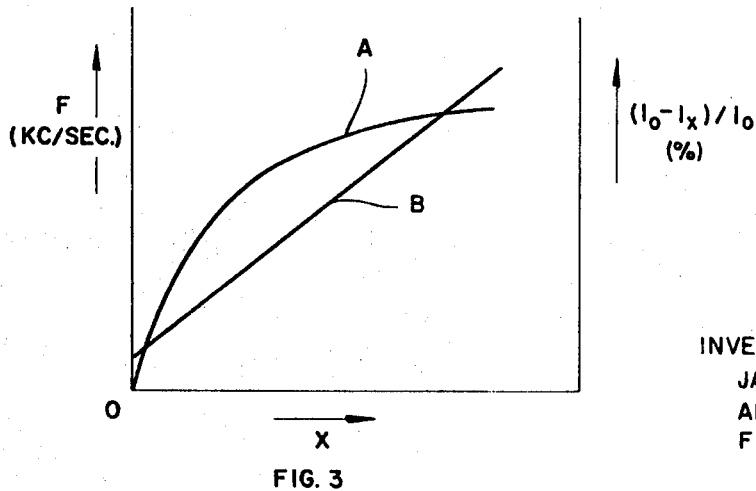
FIG. 3 shows comparative response curves of an electron capture detector operating at a constant pulse frequency as is conventional, and of an apparatus according to the present invention.

In FIG. 3 curve A shows the response obtained with an electron capture detector operating at a constant pulse frequency as is conventional.

Curve A represents the dependence of the detector current $I$—plotted as $(I_o-I_x/I_o$—on the concentration $x$ of electron capture material.

Curve B shows the response of an apparatus according to the present invention, in which apparatus the influence of the concentration $x$ on the detector current is substantially compensated. Curve B represents the dependence of the pulse frequency $F$ on the concentration $x$.

It is seen that the response of the conventionally operated detector falls off rapidly with increasing concentration $x$, whereas the response obtained when using the present invention is substantially linear.

We claim as our invention:

1. The method of linearizing the response of an electron capture measuring circuit including electron capture detector means for measuring concentration of electron capture material comprising the steps of:
   supplying a pulsed current of variable frequency to said electron capture detector means;
   sensing the detector current;
   varying said frequency in accordance with said sensed detector current; and
   providing an indication of said frequency as an indication of concentration of said electron capture material.

2. The method of claim 1, in which said frequency is varied in such a manner as to maintain said detector current substantially constant.

3. A measuring circuit in combination with an electron capture detector for measuring a concentration of an electron capture material, comprising pulse generator means of a type suitable for generating voltage pulses at a certain frequency and arranged to supply these pulses to a pair of terminals to which the detector is connected; electrometer means arranged to sense the current supplied to the detector by the said terminals and to produce at its output a signal varying in accordance with the sensed value; means connected to the electrometer output for adjusting the frequency of the pulse generator in response to the electrometer output signal and thereby opposing the influence of variations in the measured concentration on the detector current; and means for measuring said frequency as an indication of the concentration of said electron capture material.

4. Measuring circuit according to claim 3, in which the changes in frequency effected by the means for adjusting the pulse generator frequency substantially compensate for the influence of variations in the measured concentration on the detector current.

5. Measuring circuit according to claim 3, in which the relationship according to which the pulse generator frequency is adjusted in dependence on the detector current is substantially linear.

6. Measuring circuit according to claim 5, comprising means for indicating or recording the output signal of said electrometer means, which signal is a measure of the concentration to be determined.

7. Measuring circuit according to claim 5, comprising means for counting the pulses generated by said pulse generator means.

8. Measuring circuit according to claim 3, further comprising means for providing an adjustable bias in the relationship according to which the pulse generator frequency is adjusted in dependence on the detector current.

9. Measuring circuit according to claim 3, in which the output signal of the electrometer means is a variable DC voltage, while the pulse generator means and the means for adjusting the frequency thereof respectively comprise a blocking oscillator and a transistor, the transistor being arranged to control the discharge current of a condenser of the blocking oscillator (and thereby the pulse frequency) in dependence on the electrometer output voltage.

* * * * *